June 30, 1931.  A. J. VIKEN  1,812,614
TRIPOD HEAD PARTICULARLY ADAPTED FOR USE
IN CONNECTION WITH A PORTRAIT CAMERA
Filed Oct. 22, 1928
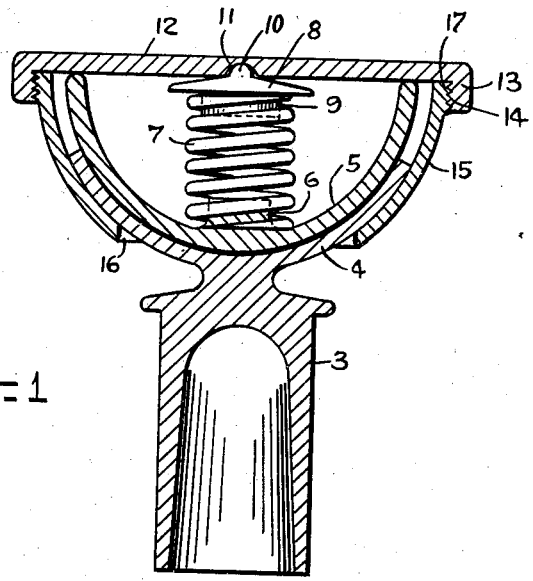
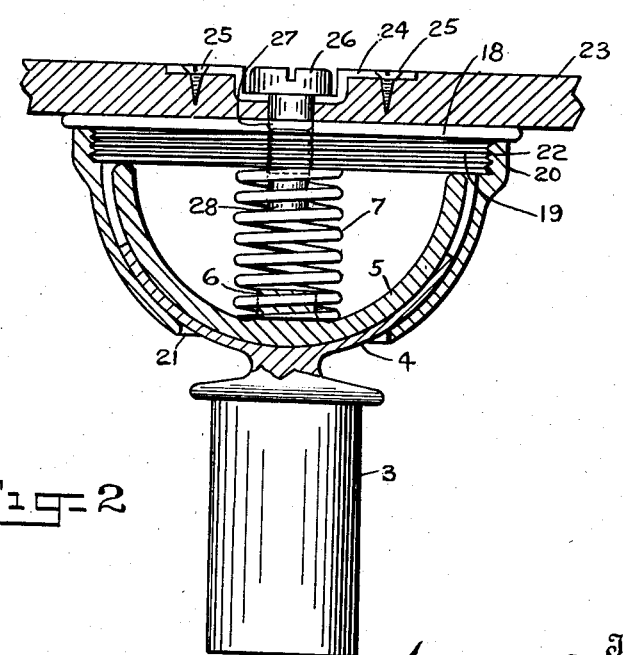

Patented June 30, 1931

1,812,614

UNITED STATES PATENT OFFICE

ANTONIUS J. VIKEN, OF JACKSON HEIGHTS, NEW YORK, N. Y., ASSIGNOR TO UNDERWOOD & UNDERWOOD, INC., OF NEW YORK, N. Y., A CORPORATION OF DELAWARE

TRIPOD HEAD PARTICULARLY ADAPTED FOR USE IN CONNECTION WITH A PORTRAIT CAMERA

Application filed October 22, 1928. Serial No. 314,128.

My invention relates to an improvement in a tripod head particularly adapted for use in connection with a portrait camera and the novelty consists in the adaptation and arrangement of parts as will be more fully hereinafter pointed out.

In the taking of children's portraits it is absolutely essential that the photographer should be able to swing the head of the tripod into any desired position quickly in order that the camera may be continuously focused upon the child whose portrait is being taken right up to the moment that the shutter is actually operated. Such a camera is shown in my U. S. Patent #1,528,464 of March 3, 1925. This is essential for the reason that in portrait photography particularly with children, the child must be given real freedom to assume a natural pose without being forced or directed so that the portrait will be an absolute reproduction of the child as it really is in life. Such freedom to the child to assume the required natural position involves the continued movement of the child and the necessary continued refocusing of the camera up to the exact moment when a desirable natural pose is taken by the child when the photographer will be instantly ready to snap his shutter and secure the portrait.

This entails the moving of the tripod and if the ground is unlevel in an outdoor picture or even in an indoor picture where the child may come closer to or go further from the tripod, it is necessary to quickly swing the head of the tripod in any and all directions to insure the correct focusing of the camera.

My construction of a new and novel tripod head permits such ready movement of the tripod head in any and all directions and also insures the tripod head remaining in such position to which it may be changed without any adjustments of any kind being made thereby solving a difficult problem which has for a long time perplexed the photographer who makes a specialty of children's portraits.

Referring to the drawings, Figure 1 is a vertical section substantially through the middle of my device.

Figure 2 is a vertical section through the middle of another form of my device in which the shank portion is shown in full.

In the drawings as shown in Figure 1, 3 is a shank which terminates at its upper end in a cup member 4 which is substantially less than semi-spherical in its shape. A second semi-spherical cup member 5 is mounted in the first cup member 4 and has a projecting nib 6 integral therewith substantially at the center of the inside of the said cup member 5. Over this nib 6 is mounted a heavy compression spring 7 and at the upper end of said spring 7 is a bearing cap 8 which has a flange 9 which rests within the upper end of the spring 7 and the cap 8 terminates at its upper end in a bearing knob 10 which seats in a bearing 11 cut into the underside of a cover plate 12 which has a downturned edge 13 which is internally threaded at 14 and into which is adapted to be screwed a third semi-spherical cup member 15 which has a circular cut out 16 at its base and is threaded externally at its upper edge at 17 to indicate the internal threading 14 of the cover 12.

In the second form of my device shown in Figure 2, 3 is a shank terminating at its upper end in a cup 4 of a shape substantially less than semi-spherical and in which rests a second semi-spherical cup 5 having a central projecting nib 6 over which the lower end of a compression spring 7 is adapted to be mounted. A cover 18 having an externally threaded flange 19 is adapted to have mounted over said threaded flange 19 a third semi-spherical cup member 20 having a circular cut out 21 at its bottom and being internally threaded at its upper edge at 22 so as to engage the threaded flange 19 of the cover 18. A camera base 23 having a bearing plate 24 secured therein by means of screws 25 has a center locking screw 26 adapted to engage an internally threaded hole 27 in the cover 18 and said screw 26 has a lower tapered end 28 which is adapted to act as a centering pin in the upper end of the compression spring 7.

In assembling my device as shown in Figure 1 the cup 5 will be placed in the cup 4 and the compression spring 7 will be placed over the nib 6 and the bearing cap 8 will be placed with the flange 9 inside of the upper end of the spring 7 and the cup member 15 will then be slid over the outside of the cup 15 and using the circular opening 16 whereby the cup 15 can be drawn into place over cup 4 and the cover 12 can then be screwed down into position over the cup 15 having centered the bearing knob 10 in the bearing 11 of the cover 12 so that the three cups 4, 5 and 15 are locked together with the compressed spring 7 effecting a heavy compression on the cup 5 thereby forcing it in a tight binding contact against the inside of the cup 4 and simultaneously pressing upwardly on the underside of the cover 12 through the cap 8 and knob 10 in bearing 11 whereby the cup 15 is drawn tightly in binding contact against the outside of the cup 4. In this manner a tight binding contact is effected between the cup 4 and the cups 5 and 15, so that the cover 12 and the cups 5 and 15 can be tilted to any position desired but always against a heavy binding contact with the cup 4 whereby the cover 12 and the cups 5 and 15 will remain in any position to which they are tilted on the cup 4 and this movement is facilitated by the leverage of the camera base which substantially overhangs the cover 12 thereby making it easy to move the cover 12 and the cups 5 and 15 in any direction and to any position desired but the heavy compression spring 7 always exerting such a pressure of the cups 5 and 15 on the cup 4 that the cover 12 and cups 5 and 15 together with the camera mounted on the cover 12 will remain in any position to which they are tilted.

When turning the camera around in the same or a fixed plane on the base 23 it is to be particularly noted that because of the constant heavy pressure exerted by spring 7 between cup 5 and cover 12 that the upper edges of the cup 5 will slightly clear the cover 12. The cup 5 will therefore be in binding contact with cup 4 and as the cover 12 and cup 15 are thus rotated in the same plane will remain in a fixed position so that there will only be a frictional contact between cup 15 and cup 4. When the head is tilted, however, the cover 12 will necessarily contact with the upper edges of the cup 5 so that the cup 5 will also move against its frictional contact with the cup 4 thereby adding this frictional contact to that between cups 4 and 15 whereby in tilting the head the resistance will be much greater than in rotating the head in the same plane. This feature of my device is most desirable in connection with the use of portrait cameras as it permits the quick and easy rotation of the cover 12 carrying the camera and prevents an accidental change through tilting in the plane of this cover 12 because of this additional frictional resistance.

In assembling my device as shown in Figure 2 the base 23 will be rigidly secured to the cover 18 by means of the screw 26 and the cup 5 having been placed in cup 4 the cup 20 can then be mounted around the outside of cup 4 by tilting the same so as to slide the cup 20 over the cup 4 making use of the circular opening 21. The cup 20 can then be screwed onto the cover 18 through engaging the internally threaded portion 22 onto the externally threaded flange 19 of the cover 18, the tapered end 28 of the screw 26 centering within the upper end of the compression spring 7.

It is apparent that many variations can be made in the exact structure shown herein without departing from the spirit and intent of my invention.

It will be understood that my tripod head of this application is particularly adapted to be used on and in connection with the tripod as shown in my copending application which is filed simultaneously with this application.

I claim:

1. In a portrait camera tripod the combination of a shank terminating at its upper end in a segmental spherical cup, a semispherical cup member seated in said first cup, a projecting nib in the center of the interor of said cup member, a heavy compression spring mounted over said nib, a bearing cap carried on the upper end of said spring, said cap seating in a bearing in the center of a circular cover plate, a downturned edge on said plate internally threaded and engaged by an externally threaded semi-spherical cup member with its lower portion cut away.

2. In a tripod head the combination of a cup less than semi-spherical in shape rigidly mounted at the head of said tripod, a semispherical cup resting in said first cup, a projection rigidly mounted in the center of said second cup, a heavy compression spring mounted over said projection, a bearing cap mounted over the head of said spring which is under constant compression between said second cup and a third semi-spherical cup having a circular open bottom and a cover threadably mounted thereon whereby substantial frictional contact is maintained between said first cup and each of the second and third cups.

In testimony whereof I affix my signature.

ANTONIUS J. VIKEN.